United States Patent
Barton et al.

(10) Patent No.: US 6,789,201 B2
(45) Date of Patent: Sep. 7, 2004

(54) ANTI-VIRUS TOOLBAR SYSTEM AND METHOD FOR USE WITH A NETWORK BROWSER

(75) Inventors: Chris A. Barton, Buckingham (GB); Lee Codel Lawson Tarbotton, Aylesbury (GB); Guy William Welch Roberts, Milton Keynes (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 351 days.

(21) Appl. No.: 10/028,151

(22) Filed: Dec. 20, 2001

(65) Prior Publication Data

US 2003/0140242 A1 Jul. 24, 2003

(51) Int. Cl.[7] .......................... H04L 9/32; G06F 11/30; G06F 12/14
(52) U.S. Cl. ................... 713/200; 713/188; 713/191
(58) Field of Search ....................... 713/191, 188, 713/200

(56) References Cited

U.S. PATENT DOCUMENTS

| | | | | |
|---|---|---|---|---|
| 5,960,170 A | * | 9/1999 | Chen et al. .................... | 714/38 |
| 6,035,423 A | * | 3/2000 | Hodges et al. ................ | 714/38 |
| 6,269,456 B1 | | 7/2001 | Hodges et al. ................ | 714/38 |
| 2002/0124181 A1 | | 9/2002 | Nambu ........................ | 713/200 |
| 2002/0152394 A1 | | 10/2002 | Kadoya ....................... | 713/191 |

OTHER PUBLICATIONS

ActiveWin.com, Norton AntiVirus 2002 Review, http://www.activewin.com/reviews/software/utils/norton/nis2002v4/nav2k2.shtml.*

BoondocksNet Shops, Software: Norton AntiVirus 2002, http://www.boondocksnet.com.*

"F–Secure Securing the Mobile Distributed Enterprise", Gummerus Printing, Jyväskylä, www.F–Secure.com.

* cited by examiner

Primary Examiner—Gilberto Barrón
Assistant Examiner—Benjamin E. Lanier
(74) Attorney, Agent, or Firm—Silicon Valley IP Group, PC; Kevin J. Zilka; Christopher J. Hamaty

(57) ABSTRACT

A system, method and computer program product are provided for affording virus-related services utilizing a network browser toolbar. Initially, a request for virus-related services is received over a network from a network browser associated with a computer. In response thereto, virus-related information is transmitted to the computer for being used in conjunction with the network browser to provide virus-related services. In use, the virus-related services are administered utilizing the virus-related information and a toolbar associated with the network browser.

27 Claims, 5 Drawing Sheets

ANTI-VIRUS TOOLBAR SYSTEM AND METHOD FOR USE WITH A NETWORK BROWSER

FIELD OF THE INVENTION

The present invention relates to network browsers, and more particularly to navigating information on the Internet utilizing a network browser.

BACKGROUND OF THE INVENTION

Computers or electronic devices which access information over a network, such as the Internet, generally utilize a software interface which permits the user to direct the operation of the computer in obtaining information from the network. In the case of the Internet, a network browser program is conventionally utilized as an interface which both provides the user with controls over navigating the network and displays on the user's computer information derived from the network.

Information displayed in the browser is provided by various "web sites" from various locations in the network, and is generally displayed as pages in the browser. This information can generally include text, graphics, sound files, video files, and other data. Included in the textual data obtained from the network and displayed in a browser page are labels, conventionally known as hyper links. These hyper links are associated with URL (Uniform Resource Locator) addresses which point to other locations of information in the network.

A user navigates through the network by selecting a hyper link, or label, displayed in the browser, and the browser then loads the corresponding URL and downloads the web page or other data associated therewith.

One common feature associated with network browsers includes toolbars. Such toolbars allow a user to "bookmark" web pages, as well as search databases and receive mail. Often, such tools are brand-specific. For example, Yahoo® has developed a toolbar with brand-specific features.

In the past, network browser toolbars have only been used for navigating the Internet, accessing general information, and providing other generic features (i.e. e-mail, etc.) Until now, none of such prior art network browser toolbars have been used to provide any particular kind of service such as network security service.

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capacities in order to cause denial of service, and so forth.

There is thus a need for a network browser toolbar that allow network users to more effectively combat security events such as viruses, etc.

DISCLOSURE OF THE INVENTION

A system, method and computer program product are provided for affording virus-related services utilizing a network browser toolbar. Initially, a request for virus-related services is received over a network from a network browser associated with a computer. In response thereto, virus-related information is transmitted to the computer for being used in conjunction with the network browser to provide virus-related services. In use, the virus-related services are administered utilizing the virus-related information and a toolbar associated with the network browser.

In one embodiment, a user of the computer may be registered. For example, personal information associated with the user of the computer may be received. Still yet, personal information associated with the user of the computer may be looked up.

In another embodiment, a plug-in may be downloaded in response to the registration. Such plug-in may be adapted for installing the toolbar associated with the network browser. Such plug-in may further be adapted for transmitting the request via the network in response to a user action. As an option, the toolbar may be displayed simultaneously with navigation icons associated with the network browser.

In the embodiment where a plug-in is included, such plug-in may include a data structure stored in memory for providing virus-related services utilizing a network browser toolbar. This data structure may include an install object for installing a toolbar associated with a network browser. Associated therewith is a communication object for requesting virus-related services over a network utilizing the toolbar. Further provided is a display object for outputting the virus-related services utilizing the toolbar.

In another embodiment, the virus-related information may be retrieved from a local database. Further, the virus-related information may be retrieved from a remote database.

In still yet another embodiment, preferences of a user of the computer may be received. Further, the virus-related information may be filtered based on the preferences. Also received may be usage data of a user of the computer. Similarly, the virus-related information may be filtered based on the usage data.

As an option, the virus-related services may include virus-related news. Further, the virus-related services may include a search engine for searching for viruses in a database of viruses. Still yet, the virus-related services may include virus-related statistics. Optionally, the virus-related services may include virus-related statistics associated with a predetermined company.

DESCRIPTION OF THE PREFERRED EMBODIMENTS

Figure 1:
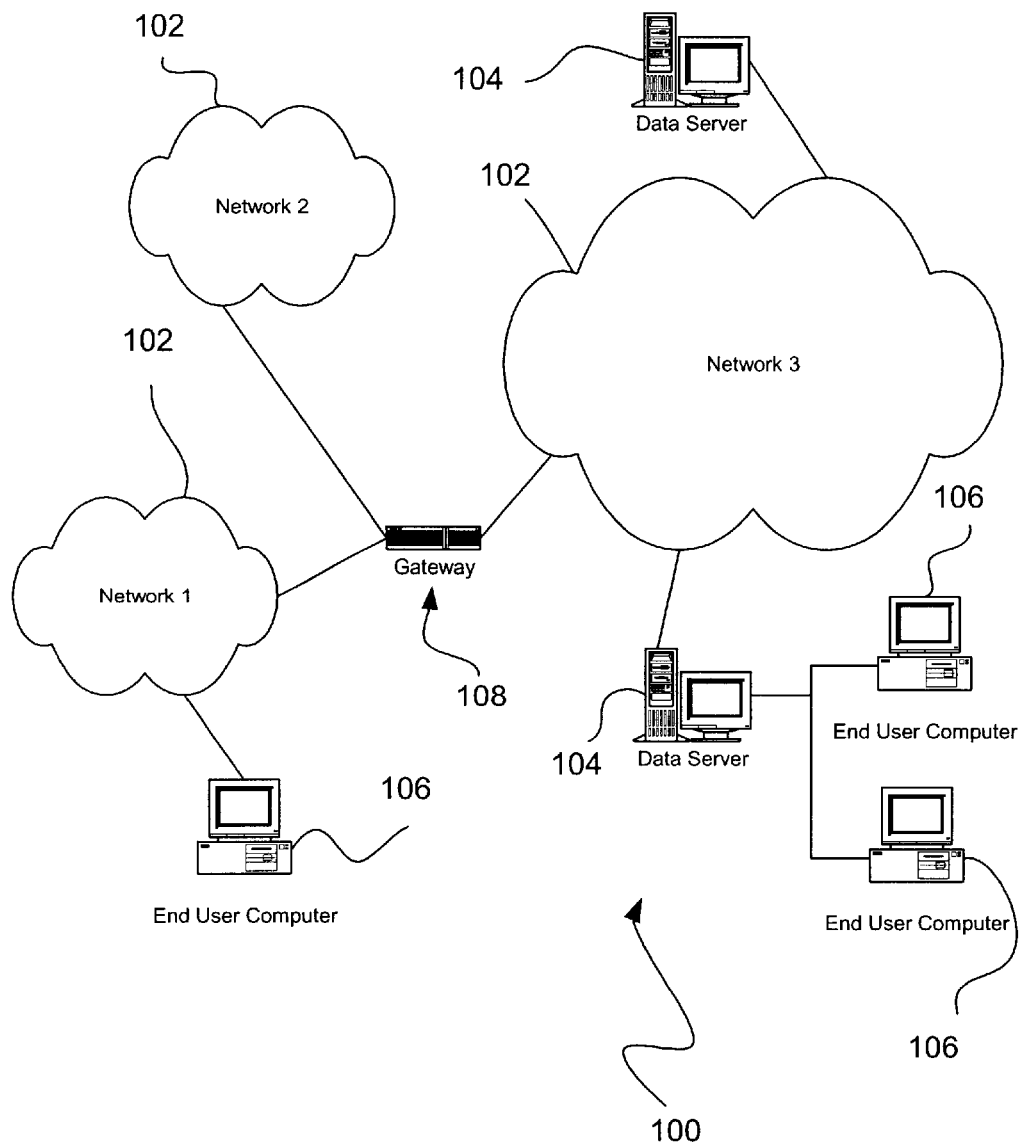
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments.

For reasons that will soon become apparent, any one or more of the data servers 104 may include various types of virus-related information. Such virus-related information may take the form of a database that may be updated and searched for providing the virus-related information to the end user computers 106. Any one or more of the end user computers 106, in turn, have a network browser installed thereon capable of communicating with the data servers 104 for administering virus-related services using the virus-related information.

Initially, a request for virus-related services is received over the networks 102 from a network browser associated with at least one of the end user computers 106. In response thereto, virus-related information is transmitted to the end user computer 106 for being used in conjunction with the network browser to provide virus-related services. In use, the virus-related services are administered utilizing the virus-related information and a toolbar associated with the network browser.

By this design, a user is capable of browsing the networks 102 and, at the same time, be provided with virus-related services capable of promoting the security of the end user computer 106. Such virus-related services are thus provided at a time when the computer 106 is most vulnerable to a virus attack, namely when navigating data on the networks 102 which are often not secure. One exemplary application of such technique will be set forth hereinafter in greater detail.

Figure 2:
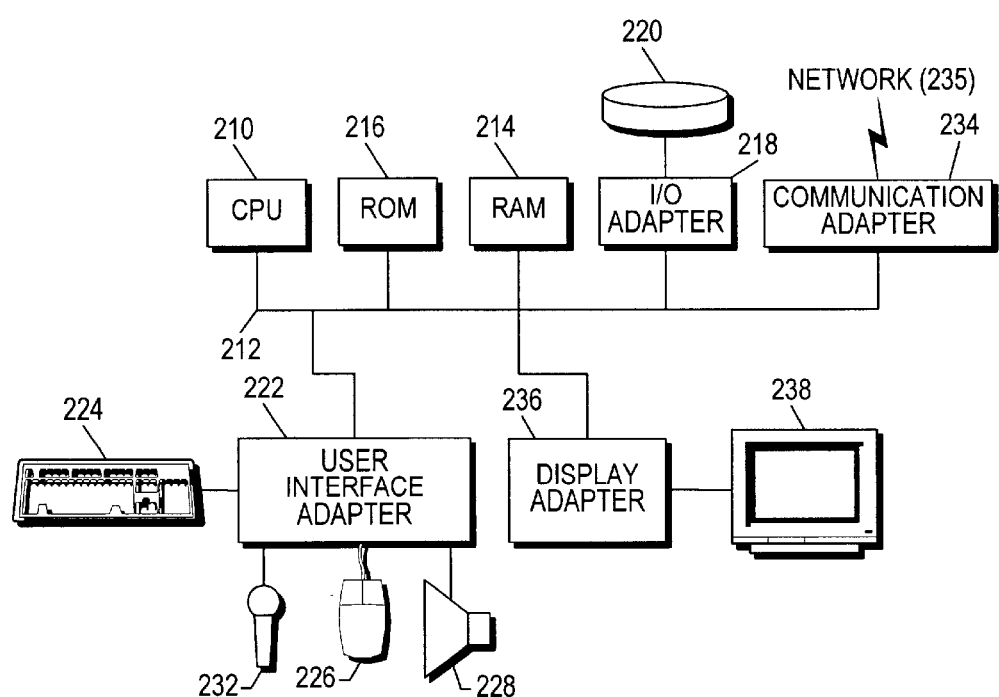
FIG. 2 shows a representative hardware environment that may be associated with the data servers and computers of FIG. 1, in accordance with one embodiment.

FIG. 2 shows a representative hardware environment that may be associated with the data servers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected over a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft® WindowsNT® or Windows95/98® Operating System (OS), the IBM® OS/2® operating system, the MacOS®, or UNIX® operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
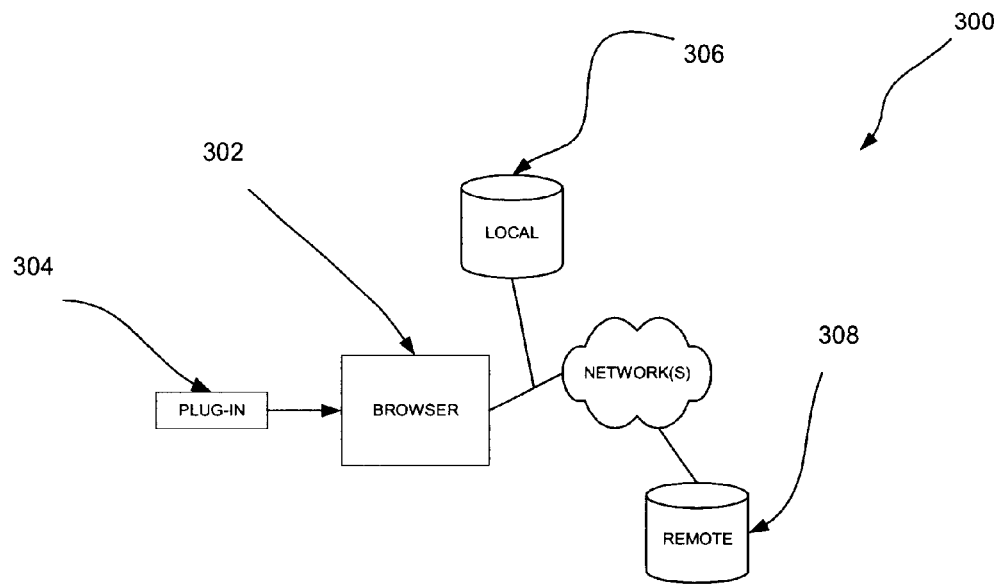
FIG. 3 illustrates a diagram showing a system capable of administering virus-related services, in accordance with one embodiment.

FIG. 3 illustrates a diagram showing a system 300 capable of administering virus-related services, in accordance with one embodiment. Such system 300 may or may not be implemented in the context of the network architecture shown in FIGS. 1 and 2.

As shown, a network browser 302 is installed on a computer. Such network browser 302 may include a Microsoft® Internet Explorer® Network Browser, a Netscape® Communicator® Network Browser, or any other software capable of browsing a network. Associated with the network browser is a plug-in 304. Such plug-in 304 includes a program that may be installed and used as part of the network browser 302.

Typically, the network browser 302 allows one to download, install, and define such supplementary programs in the form of plug-ins 304 that are capable of various functions. In use, the plug-in 304 is recognized automatically by the network browser 302 and its function is integrated into the use of the network browser 302. In the context of the present embodiment, the plug-in 304 is capable of providing virus-related services.

In one embodiment, the plug-in 304 may include a data structure stored in memory for providing virus-related services utilizing a network browser toolbar. This data structure may include an install object for installing a toolbar associated with a network browser. Associated therewith is a communication object for requesting virus-related services over a network utilizing the toolbar. Further provided is a display object for outputting the virus-related services utilizing the toolbar. More information as to the manner in which such objects carry out their designated functions will be set forth hereinafter in greater detail.

To administer the virus-related services, the network browser 302 and associated computer are capable of communicating with remote databases 308 and local databases 306 on data servers on a network. More information on how such virus-related services may be administered will now be set forth.

Figure 4:
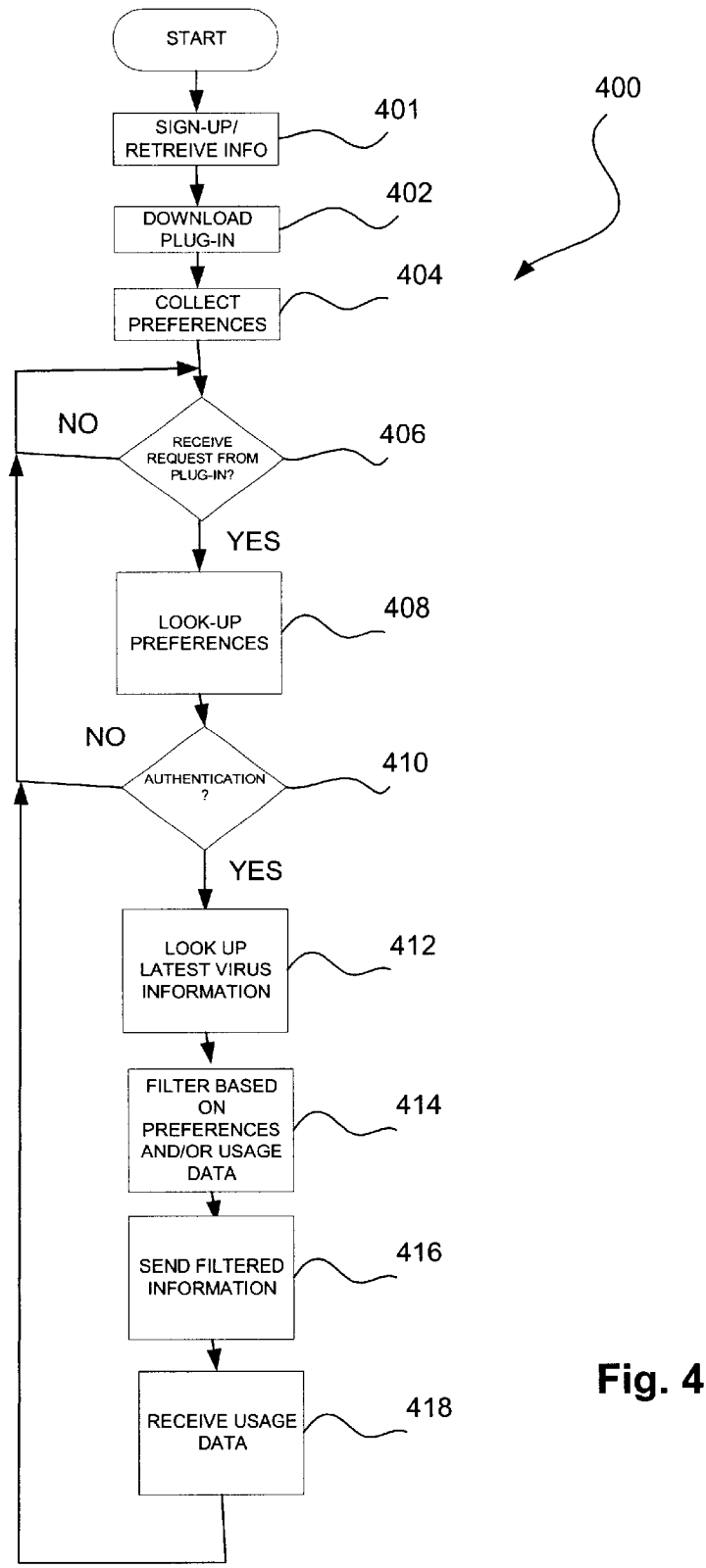
FIG. 4 illustrates a method for affording virus-related services utilizing a network browser toolbar.

FIG. 4 illustrates a method 400 for affording virus-related services utilizing a network browser toolbar. In one embodiment, the present method 400 may be used in the context of the architecture like that mentioned hereinabove during reference to FIGS. 1–3. Of course, the present techniques may be utilized in any desired context.

Initially, a user of a computer on a network is registered in operation 401. This may be accomplished in any desired manner. Just by way of example, a registration "sign-up" process may be carried out utilizing a network browser. In an embodiment where a plurality of users is already registered for general virus-related services, the registration may simply involving identifying a current user.

Next, the user is provided with a plug-in in operation 402, in response to the registration process of operation 401. This may be accomplished by simply downloading the plug-in using a network browser, after which the plug-in may be executed and installed using conventional techniques.

Thereafter, preferences associated with the user may be collected in operation 404. Such preferences many be collected using a hypertext markup language (HTML) page received from a server. In the alternative, the preference collection process may include using an interface associated with the plug-in, after which the preferences may then be sent to the server.

In one embodiment, the preferences may include a type/level of virus-related services desired by the user, a location of the user, a category associated with the user, and/or any other factor that may be used to tailor, personalize, and/or otherwise alter virus-related services.

Once the preferences are collected and the plug-in is installed, a toolbar may then be displayed simultaneously with the network browser. More information regarding one exemplary toolbar will be set forth during reference to FIG. 5.

During the course of use of the toolbar-equipped network browser, it is determined whether a user has initiated a request for virus-related services in decision 406. This may be initiated by a user action utilizing the toolbar or any other desired mechanism. Once initiated, a request may be received at the server from the plug-in of the network browser. Of course, the request may be received from the plug-in automatically without being initiated by the user, depending on the nature of the virus-related services to be administered or any other factor.

Once the request is received and identified, the user associated with the request is identified so that the corresponding preferences may be identified in operation 408. This may be accomplished by looking up the preferences in a table based on a user identifier (i.e. cookie, etc.) or by any other viable technique.

As an option, a password may be required with the request for security purposes. Such password may be entered each time a virus-related service is requested, or may be done once at installation or boot-up time. In such embodiment, it is determined in decision 410 whether the password is authentic.

Next, in operation 412, virus-related information is looked up from a local and/or remote database. Since such databases may be constantly updated, the virus-related information may be looked up each time the request is received. In one embodiment, the virus-related information may include virus news, general virus information, a virus name, virus statistics, or any other virus-related information required to carry out the desired virus-related services.

It should be noted that, in addition to preferences, the present method 400 also collects usage data in operation 418. Such usage data may include various uniform resource locators (URLs) that were accessed by the network browser, any actively submitted input from the user, or any other data associated with the usage of the network browser and/or any virus-related information received by way of the present method 400.

In operation 414, the virus-related information is filtered based on the preferences and/or usage data. This may be accomplished in any desired manner. In particular, the preferences may be used to tailor, personalize, and/or otherwise alter virus-related services. Just by way of example, only a portion of the virus-related information that pertains to the user may be used. Such portion of the virus-related information may pertain to a location of the user, a type/level of virus-related services desired by the user, a category associated with the user, etc.

Next, in operation 416, the filtered virus-related information is sent to the network browser. By this design, virus-related services may be administered using the virus-related information in a manner that is tailored and relevant to the user. In use, the virus-related services are administered utilizing a toolbar associated with the network browser and the virus-related information.

As an option, the virus-related services may include virus-related news. Further, the virus-related services may include a search engine for searching for viruses in a database of viruses. Still yet, the virus-related services may include virus-related statistics. Optionally, the virus-related services may include virus-related statistics associated with a predetermined company. Further, virus-related security services may be rendered for enhancing anti-virus efforts (i.e. .DAT delivery, etc.). Of course, the virus-related services may include any desired virus-related services capable of contributing to the security of a computer and/or an associated network.

Figure 5:
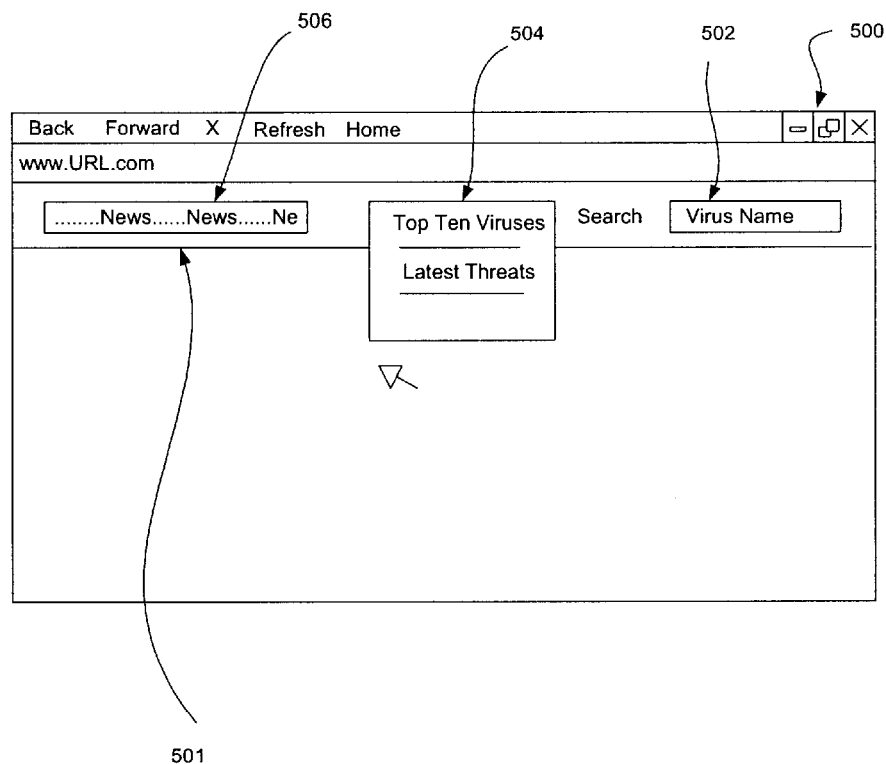
FIG. 5 illustrates a network browser interface including a toolbar, in accordance with one embodiment.

FIG. 5 illustrates a network browser interface 500 including a toolbar 501, in accordance with one embodiment. As shown, the toolbar 501 may be positioned adjacent to and below a navigation control window associated with the network browser interface 500. Of course, the toolbar 501 may be positioned in any relation to other components of the network browser interface 500 such that the toolbar 501 is displayed simultaneously with the navigation control window as well as the HTML content being displayed.

In an embodiment where news is provided as a virus-related service, the toolbar 501 further includes a news window 506. Such news window 506 may include manually or automatically scrolling news (i.e. recent events, etc.) associated with viruses.

Further, a pull down menu 504 may be provided in the toolbar 501 for providing various personalized and/or general information such as the top ten viruses currently found on a network, latest threats, virus identification techniques, and/or various other statistics. Any of such information may be displayed in the pop-up window, or by linking to a predetermined URL.

Still yet, the toolbar 501 may include an input field 502 for receiving a string from the user. In one embodiment, such input field 502 may be adapted to receive a virus name or other search term. In response to such input, the present embodiment may provide a pop-up window or connect to a predetermined URL, and provide information relating to the search query.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for providing virus-related services utilizing a network browser toolbar, comprising:

receiving a request for virus-related services over a network from a network browser associated with a computer; and transmitting virus-related information to the computer for being used in conjunction with the network browser to provide virus-related services;

wherein the virus-related services are administered utilizing a toolbar associated with the network browser and the virus-related information;

wherein the toolbar is separate from and displayed simultaneously with navigation icons of the browser and hypertext markup language (HTML) content.

2. The method as recited in claim 1, and further comprising receiving personal information associated with a user of the computer.

3. The method as recited in claim 1, and further comprising looking up personal information associated with a user of the computer.

4. The method as recited in claim 1, and further comprising registering a user of the computer.

5. The method as recited in claim 4, and further comprising downloading a plug-in in response to the registration.

6. The method as recited in claim 5, wherein the plug-in is adapted for installing the toolbar associated with the network browser.

7. The method as recited in claim 5, wherein the plug-in is adapted for transmitting the request via the network in response to a user action.

8. The method as recited in claim 1, wherein the toolbar is displayed adjacent to and simultaneously with a uniform resource locator (URL) field associated with the network browser.

9. The method as recited in claim 1, wherein the virus-related information is retrieved from a local database.

10. The method as recited in claim 1, wherein the virus-related information is retrieved from a remote database.

11. The method as recited in claim 1, and further comprising receiving preferences of a user of the computer.

12. The method as recited in claim 11, and further comprising filtering the virus-related information based on the preferences.

13. The method as recited in claim 1, and further comprising receiving usage data of a user of the computer.

14. The method as recited in claim 13, and further comprising filtering the virus-related information based on the usage data.

15. The method as recited in claim 1, wherein the virus-related services include virus-related news.

16. The method as recited in claim 1, wherein the virus-related services include a search engine for searching for viruses in a database of viruses.

17. The method as recited in claim 1, wherein the virus-related services include virus-related statistics.

18. The method as recited in claim 1, wherein the virus-related services include virus-related statistics associated with a predetermined company.

19. A computer program product for providing virus-related services utilizing a network browser toolbar, comprising:

(a) computer code for receiving a request for virus-related services over a network from a network browser associated with a computer; and (b) computer code for transmitting virus-related information to the computer for being used in conjunction with the network browser to provide virus-related services;

(c) wherein the virus-related services are administered utilizing a toolbar associated with the network browser and the virus-related information;

(d) wherein the toolbar is separate from and displayed simultaneously with navigation icons of the browser and hypertext markup language (HTML) content.

20. A system for providing virus-related services utilizing a network browser toolbar, comprising:

(a) logic for receiving a request for virus-related services over a network from a network browser associated with a computer; and (b) logic for transmitting virus-related information to the computer for being used in conjunction with the network browser to provide virus-related services;

(c) wherein the virus-related services are administered utilizing a toolbar associated with the network browser and the virus-related information;

(d) wherein the toolbar is separate from and displayed simultaneously with navigation icons of the browser and hypertext markup language (HTML) content.

21. A system for providing virus-related services utilizing a network browser toolbar, comprising:

(a) means for receiving a request for virus-related services over a network from a network browser associated with a computer; and (b) means for transmitting virus-related information to the computer for being used in conjunction with the network browser to provide virus-related services;

(c) wherein the virus-related services are administered utilizing a toolbar associated with the network browser and the virus-related information;

(d) wherein the toolbar is separate from and displayed simultaneously with navigation icons of the browser and hypertext markup language (HTML) content.

22. A plug-in data structure stored in memory for providing virus-related services utilizing a network browser toolbar, comprising:

(a) an install object for installing a toolbar associated with a network browser; and (b) a communication object for requesting virus-related services over a network utilizing the toolbar; and (c) a display object for outputting the virus-related services utilizing the toolbar;

(d) wherein the toolbar is separate from and displayed simultaneously with navigation icons of the browser and hypertext markup language (HTML) content.

23. A method for providing virus-related services utilizing a network browser toolbar, comprising:

(a) registering a user of a computer on a network;

(b) downloading a plug-in to the computer over the network in response to the registration;

(c) installing a toolbar on a network browser of the computer utilizing the plug-in;

(d) receiving preferences of the user of the computer;

(e) receiving a request for virus-related services over the network from the network browser utilizing the plug-in;

(f) identifying the user associated with the request;

(g) looking up the preferences associated with the user of the computer in response to the request;

(h) retrieving virus-related information in response to the request;

(i) filtering the virus-related information based on the preferences; and (j) transmitting the filtered virus-related information to the computer;

(k) wherein the virus-related services are administered utilizing the toolbar associated with the network browser and the virus-related information;

(l) wherein the toolbar is separate from and displayed simultaneously with navigation icons of the browser and hypertext markup language (HTML) content.

24. A method for requesting virus-related services utilizing a network browser toolbar, comprising:

receiving a request for virus-related services utilizing a network browser associated with a computer; and wherein the virus-related services are requested utilizing a toolbar associated with the network browser;

wherein the toolbar is separate from and displayed simultaneously with navigation icons of the browser and hypertext markup language (HTML) content.

25. A method for providing virus-related services utilizing a network browser toolbar, comprising:

providing virus-related services utilizing a network browser associated with a computer; and wherein the virus-related services are provided utilizing a toolbar associated with the network browser;

wherein the toolbar is separate from and displayed simultaneously with navigation icons of the browser and hypertext markup language (HTML) content.

26. A plug-in data structure stored in memory for requesting virus-related services utilizing a network browser toolbar, comprising:

an install object for installing a toolbar associated with a network browser; and a display object for allowing a user to request virus-related services utilizing the toolbar;

wherein the toolbar is separate from and displayed simultaneously with navigation icons of the browser and hypertext markup language (hTML) content.

27. A plug-in data structure stored in memory for providing virus-related services utilizing a network browser toolbar, comprising:

an install object for installing a toolbar associated with a network browser; and a display object for providing virus-related services utilizing the toolbar;

wherein the toolbar is separate from and displayed simultaneously with navigation icons of the browser and hypertext markup language (HTML) content.

* * * * *

UNITED STATES PATENT AND TRADEMARK OFFICE
CERTIFICATE OF CORRECTION

| | | |
|---|---|---|
| PATENT NO. | : 6,789,201 B2 | Page 1 of 1 |
| APPLICATION NO. | : 10/028151 | |
| DATED | : September 7, 2004 | |
| INVENTOR(S) | : Barton et al. | |

It is certified that error appears in the above-identified patent and that said Letters Patent is hereby corrected as shown below:

In the claims:

col. 10, line 10, change "(hTML)" with --(HTML)--.

Signed and Sealed this
Twenty-fifth Day of January, 2011

David J. Kappos
*Director of the United States Patent and Trademark Office*